United States Patent [19]
Parish et al.

[11] Patent Number: 5,456,947
[45] Date of Patent: Oct. 10, 1995

[54] UNSATURATED POLYESTER RESINS FOR CURABLE POLYESTER RESIN SYSTEMS HAVING IMPROVED ADHESION TO SUBSTRATES

[75] Inventors: David M. Parish, Loveland; John A. Hatton, Jr., Fayetteville, both of Ohio

[73] Assignee: Fibre Glass-Evercoat Company, Inc., Cincinnati, Ohio

[21] Appl. No.: 656,448

[22] Filed: Feb. 19, 1991

[51] Int. Cl.$^6$ ............................................. B05D 3/02
[52] U.S. Cl. .................. 427/372.2; 528/272; 528/303; 528/306; 525/437; 525/445; 525/450; 525/451; 427/384; 427/385.5
[58] Field of Search ........................ 528/272, 303, 528/306; 525/437, 445, 450, 451; 427/372.2, 384, 385.5

[56] References Cited

U.S. PATENT DOCUMENTS

| | | | |
|---|---|---|---|
| 3,465,061 | 9/1969 | Fekete et al. | 525/19 |
| 3,968,181 | 7/1976 | Uzelmeier et al. | 528/115 |
| 4,122,132 | 10/1978 | Murata et al. | 525/69 |
| 4,357,456 | 11/1982 | Lopez et al. | 528/111.5 |
| 4,745,141 | 5/1988 | Akiyama et al. | 523/500 |
| 4,893,055 | 1/1990 | Fuzii et al. | 313/479 |
| 4,990,397 | 2/1991 | Tsunemi et al. | 428/246 |
| 5,002,976 | 3/1991 | McConnell et al. | 522/107 |

OTHER PUBLICATIONS

Technical Bulletin, *Polyite* 32–367, Polyester Resins, Aug. 1977, RCI.

*Primary Examiner*—Samuel A. Acquah
*Attorney, Agent, or Firm*—Killworth, Gottman, Hagan & Schaeff

[57] ABSTRACT

A determined amount of at least $C_8$ dicarboxylic functional unsaturated anhydride or acid, excluding polymeric anhydrides and acids, is incorporated in an unsaturated polyester resin which comprises (1) a condensation polymer which is the reaction product of: (a) dicarboxylic acid, at least a portion of which contains ethylenic unsaturation, with (b) dihydric alcohols; and (2) an alpha-beta-ethylenically unsaturated copolymerizable monomer, to provide modified polyester resins for curable polyester resin systems having improved cohesive and adhesive strengths of the cured resin and improvement in adhesion of such systems to a wide range of substrates, especially substrates considered extremely difficult to bond to, viz., hot dipped galvanized steel, stainless steel, copper, bronze, tin, aluminum, solder, brass and glass (silicon oxide), while also reducing or effectively eliminating retardation of cure by the presence of galvanized (zinc) coated steel or the like.

6 Claims, 1 Drawing Sheet

ANHYDRIDE

ACID

UNSATURATED POLYESTER RESINS FOR CURABLE POLYESTER RESIN SYSTEMS HAVING IMPROVED ADHESION TO SUBSTRATES

This invention relates to curable polyester resins useful in body filler systems for automobile body repair, boat repair and the like, and more particularly to polyester resins having incorporated therein an adhesion improving component which provides an unexpected and in our experience an unexcelled improvement in adhesion to a wide range of substrates, especially those considered extremely difficult to bond to, substrates such as hot dipped galvanized steel, copper, bronze, tin, solder, aluminum, brass, stainless steel, glass and the like.

BACKGROUND OF THE INVENTION

Curable polyester resin systems have been widely used in varied applications, such as in polyester body filler systems and glass reinforced polyester body filler systems used in the automotive body repair field where body filler systems are used to fill dents, and also, when provided with glass reinforcement, are used for filling holes in body panels and the like. Such systems are usually designed to cure to sufficient strength and to sandable condition within twenty minutes. However, while the polyester resin filler systems, both unreinforced and reinforced, adhere securely to properly prepared steel body parts, they have poor adhesion to many substrates such as hot dipped galvanized steel, copper, bronze, tin, solder, brass, stainless steel, aluminum, glass (silicon oxide) and the like. The poor adhesion characteristics of the polyester resin dent and polyester resin hole filler systems present substantial problems in their use and thus, for an extended period of time, such problems have been recognized as continuing problems which effectively limit many uses of the polyester filler systems.

In the case of hot dipped galvanized substrates, the poor adhesion problem is aggravated by the fact that the galvanize (zinc) retards curing of the resin system, delaying sanding and further operations on the filler, and, in some cases, may prevent a full cure. The failure of the filler system to fully cure results in the poor adhesion to the substrate being weakened even further and the filler having reduced cohesive strength as well.

SUMMARY OF THE INVENTION

This invention, among other things, comprises the incorporation of a determined amount of at least $C_8$ dicarboxylic functional unsaturated anhydride or acid, excluding polymeric anhydrides and acids, in an unsaturated polyester resin which comprises;

(1) a condensation polymer which is the reaction product of:
   (a) dicarboxylic acid, at least a portion of which contains ethylenic unsaturation, with
   (b) dihydric alcohols; and
(2) an alpha-beta-ethylenically unsaturated copolymerizable monomer, to provide modified polyester resins for curable polyester resin systems having unexpected improvement in cohesive and adhesive strengths of the cured resin and improvement in adhesion of such systems to a wide range of substrates, especially substrates considered extremely difficult to bond to, such as hot dipped galvanized steel, stainless steel, copper, bronze, tin, aluminum, solder, brass and glass, to name a few representative materials, while also reducing or effectively eliminating retardation of cure by the presence of galvanized (zinc) coated steel or the like.

Detailed Description of the Invention

Figure 1:
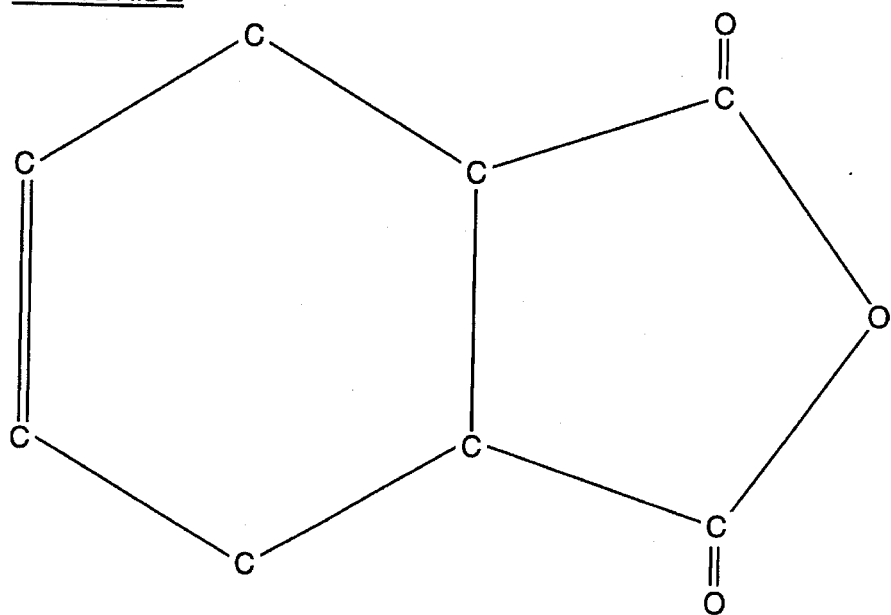

This invention comprises the incorporation of a determined amount of at least $C_8$ dicarboxylic functional unsaturated anhydride or acid, excluding polymeric anhydrides and acids, which may vary over a much wider range, but is usually restricted to a preferred range of 1–5% based on total resin weight in an unsaturated polyester resin which comprises;

(1) a condensation polymer which is the reaction product of:
   (a) dicarboxylic acid, at least a portion of which contains ethylenic unsaturation, with
   (b) dihydric alcohols; and
(2) an alpha-beta-ethylenically unsaturated copolymerizable monomer.

The addition of at least $C_8$ dicarboxylic functional unsaturated anhydride or acid and the process of its incorporation in unsaturated polyester resins for curable polyester resin systems provides an unexpected improvement in adhesion of such systems to a wide range of substrates, especially substrates considered extremely difficult to bond to, such as hot dipped galvanized steel, stainless steel, copper, bronze, tin, aluminum, solder, brass and glass, to name a few representative materials. Also, when used in curable polyester filler systems, the filler cures to higher cohesive and adhesive strengths in a given amount of time and reduces or effectively eliminates retardation of cure by the presence of galvanized (zinc) coated steel or the like.

We have found that surfaces which exhibit a positively charged oxide content are receptive to the invention. Such positively charged oxide content is not limited to metal oxides, but includes certain nonmetallic oxides, such as glass (silicon oxide). However, it is at times necessary to produce the ionic nature required on the surface, viz., in the case of aged glass, the water of absorption must be eliminated thereby creating a positively charged surface.

The at least $C_8$ dicarboxylic functional unsaturated anhydride or acid is incorporated in the resin. This incorporation is best accomplished by, but not limited to, mixing under normal agitation speeds with slightly elevated temperature in the resin, i.e., in the range of 85° F. to 95° F.+5° F. in the resin only portion of any given formulation so that the mixing results in the at least $C_8$ dicarboxylic functional unsaturated anhydride or acid being thoroughly dispersed and thoroughly mixed in the resin wherein it is incorporated and appears to lose its aromaticity. Incorporation of this material by this method does not adversely effect any other typical properties, such as shelf stability, gel time, sandability, viscosity, etc. of the resin, primarily due to the rapid configuration change upon incorporation of the at least $C_8$ dicarboxylic functional unsaturated anhydride or acid into the resin matrix. However, due to the rapid configuration change upon incorporation into the resin matrix, the presence of the incorporated constituent is not substantially detectable until tile interfacial reaction has taken place between the resin system and the substrate when it can be detected as the complexed oxide. It is also detectable in the liquid phase, as an intermediate constituent before incorporation into the resin matrix is completed. For example, a Fourier Transform Infrared Spectrometer may be used:

1. to scan the resin before the at least $C_8$ dicarboxylic functional unsaturated anhydride or acid (sometimes hereinafter $C_8$ additive) is added, and the spectrometer detects the resin;

2. to scan the at least $C_8$ additive before it is added to the resin, and the spectrometer detects the at least $C_8$ additive;

3. to scan the resin and at least $C_8$ additive after the latter is added to the resin and before incorporation is completed, and the spectrometer may detect the resin and additive, but due to the fact that incorporation proceeds so rapidly, there is no certainty that a scan can be made before incorporation is complete because of the various adjustments and setups that must be made in connection with taking such scan;

4. to scan the resin after incorporation of the at least $C_8$ additive has been effected, and the spectrometer detects an intermediate which is neither the resin nor the additive;

5. to scan the product with incorporated at least $C_8$ additive after the product has been cured and stripped from its substrate, and the spectrometer will detect the complexed oxide of the substrate and the at least $C_8$ dicarboxylic functional unsaturated anhydride or acid; and 6. to scan the substrate after the product has been stripped from it, in which case the spectrometer will detect the complexed oxide of the substrate and the at least $C_8$ additive.

Incorporation of the at least $C_8$ dicarboxylic functional unsaturated anhydride or acid will have such effect on any unsaturated orthophthalic or isophthalic polyester resinous system to some degree. Higher quality polyester and polyester systems are effected, but to a lesser degree, than those that have more property enhancement to gain. This invention's effectiveness is limited, or in certain situations eliminated, when used in systems which contain as one of their formulation constituents, metal oxide pigments such as aluminum oxide, ferrous oxide, etc., unless they are or are rendered non-ionic, thereby eliminating reaction of the at least $C_8$ dicarboxylic functional unsaturated anhydride or acid with them prior to migration of the at least $C_8$ dicarboxylic functional unsaturated anhydride or acid to the substrate interface where the bonding reaction should take place.

This invention is further believed to be unique by use of a pseudo resin acid increase, which is contrary to the common and suggested method of producing a higher quality resin by reducing its acid number.

This invention also differs from the use heretofore of coupling agents as their effects, while somewhat similar in that they have an organic functional end that allows for reaction with an organic matrix resin, they are not incorporated in the resin before the latter is catalyzed for they are commonly bonded to the substrate surface first, and the substrate is usually silica. Their bonding mechanism consists of oligimerization of a partially or fully hydrolized silica functional end group referred to as a silane, silanol or siloxane to the silica surface, leaving the organic functional end available for reaction with a resin matrix. These are primarily used in the fiberglass or silica filler treatment industries.

Figure 2:
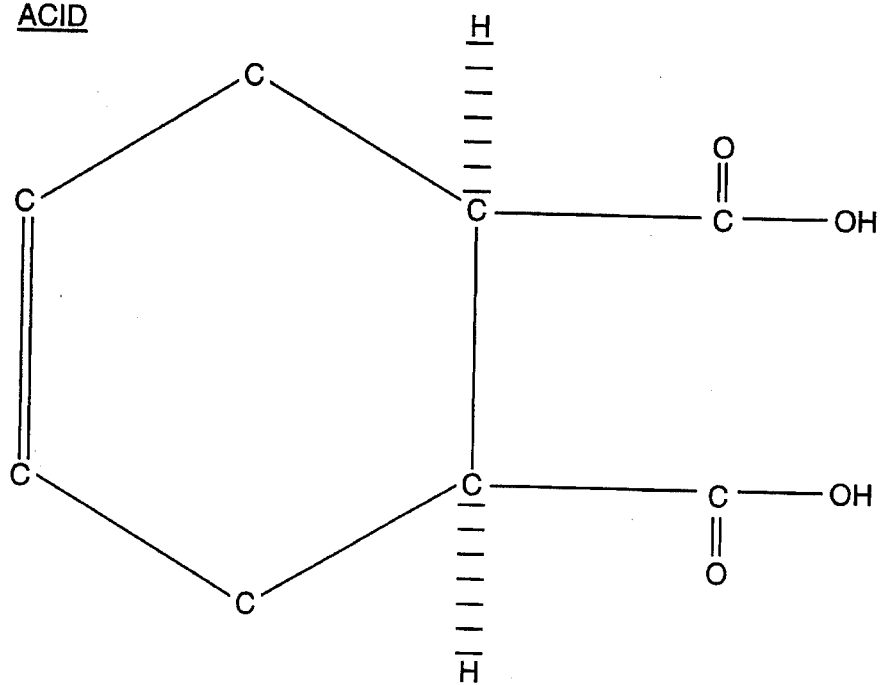

The structure illustrated in FIG. 1 describes types of anhydrides previously discussed, but does not limit or exclude the use of more complex or conjugated types. The structure illustrated in FIG. 2 describes types of acids previously discussed, but does not limit or exclude the use of more complex or conjugated types. Both the anhydrides structure of FIG. 1 and the acids structure of FIG. 2, it should be noted, contain a CIS configuration believed to be material to the present invention.

It should be further noted that the aromatic rings may be substituted with one or more non-functional groups adding to the molecular weight as well as the carbon content, but this cannot however be generalized to include repeating linear polymeric substitutions as it is believed to be restricted to molecules exhibiting ample aromaticity which is lost upon incorporation into the resin with slight heat. Linear configurations are believed to be effective if, but only if, they are of at least $C_8$ or less types and contain dicarboxylic functionality and contain a double bonded end group opposite of that dicarboxylic functionality. It is believed that linear configurations would rarely, if ever, occur in a stable usable form and, therefore, were not considered as feasible for this invention.

The improved adhesion properties imparted to commercially available curable polyester resin body filler systems modified in accordance with the instant invention will be further understood by referring to the following examples. A commercially available curable polyester resin body filler system having a catalyst as one component and an unsaturated polyester resin.

(1) a condensation polymer which is the reaction product of:
   (a) dicarboxylic acid, at least a portion of which contains ethylenic unsaturation, with
   (b) dihydric alcohols; and (2) an alpha-beta-ethylenically unsaturated copolymerizable monomer as a second component, such a curable unsaturated polyester resin of the currently available body filler system was divided into samples. One of the samples was not modified and is referred to hereinafter as a standard resin. Each of the other samples was heated to a temperature in the range of 85° F. to 95° F. and modified by adding a respective determined amount of a selected additive which is a dicarboxylic functional unsaturated anhydride or acid, excluding polymeric anhydrides and acids, and the resin and additive were mixed under normal agitation speeds until the additive was thoroughly dispersed and incorporated in the resin.

Such a glass reinforced curable polyester resin body filler system was divided into samples. One of the samples was not modified and is referred to hereinafter as a reinforced standard resin. Each of the other reinforced resin samples was heated to a temperature in the range of 85° F. to 95° F. and modified by adding a respective determined amount of a selected additive which is a dicarboxylic functional unsaturated anhydride or acid, excluding polymeric anhydrides and acids, and the reinforced resin and additive were mixed under normal agitation speeds until the additive was thoroughly dispersed and incorporated in the reinforced resin sample.

In modifying the samples of the resin component mentioned above, a representative amount of the presently preferred type of dicarboxylic functional unsaturated anhydride was incorporated in one sample, a representative amount of the presently preferred type of dicarboxylic functional unsaturated acid was incorporated in another sample, and a dicarboxylic functional unsaturated anhydride or acid not comprehended by this invention was incorporated in a third sample of the resin and are listed in TABLE I, namely:

TABLE I

| Additive | Also referred to as |
| --- | --- |
| Tetrahydrophthalic Anhydride | THPAn |
| Tetrahydrophthalic Acid | THPAc |
| Maleic Anhydride | MA | and the levels at which they were respectively added to the samples are set forth in TABLE II. The levels were based on the resin content of the samples and were adjusted to give the same amount of active acid.

TABLE II

| THPAn | 1.0% |
| --- | --- |
| THPAc | 1.0% |
| MA | 0.64% |

Substrate panels for use in testing adhesion strength of cured polyester resins resulting from catalyzation of the above described samples and modified samples of commercially available curable polyester resin body filler systems were prepared in the form of 1"×4" lap shear panels of hot dipped galvanized steel, of steel and of aluminum so as to provide three different substrates. Each of the lap shear panels was lightly sanded to the same degree by using an automatic sanding machine so as to obtain uniform sanding. Each one of the resin samples was in succession catalyzed with the catalyst which was the first component of the above described commercially available resin body filler system using the standard procedure described in the instructions accompanying the commercial products. An equal amount by weight (0.25 gram) of catalyzed product was placed on one lap shear panel and a second lap shear panel was placed in overlapping relation to one square inch of the first lap shear panel so that one square inch of each of the overlapping panels was in contact with the catalyzed resin. The resin was permitted to cure for a selected time at room temperature and the pair of lapped panels was then mounted on a Tinius Olsen Tensile Tester which was operated at a speed of 0.50"/minute and with a load cell loaded at 5000 psi. The tensile strength reached as adhesive and/or cohesive failure occurred was recorded.

Three lap shear panel assemblies of hot dipped galvanized steel panels, three lap shear panel assemblies of steel panels and three lap shear panel assemblies of aluminum panels were so prepared and were permitted to cure for twenty minutes at room temperature and were then tested utilizing each respective resin sample prepared as described above. The average pounds tensile strength for each resin sample for hot dipped galvanized steel, steel and aluminum after curing for twenty minutes appears in the following TABLE III. The twenty minute cure time frame was used to represent the approximate time after which those in the industry using these types of products expect the product to be in condition for further finishing of the repair by sanding the respective applied resin.

TABLE III

Standard/Modified Body Filler
20 minute averages = PSI

| | | Resin System | Reinforced Resin System |
| --- | --- | --- | --- |
| Standard: | Galvanized | 369.3 | 410.7 |
| THPAn: | Galvanized | 602.0 | 581.0 |
| THPAc: | Galvanized | 716.6 | |
| MA: | Galvanized | 265.7 | 437.0 |
| Standard: | Steel | 1398.3 | 1318.3 |
| THPAn: | Steel | 1543.0 | 1379.3 |
| THPAc: | Steel | 1716.0 | |
| MA: | Steel | 1335.7 | 1337.0 |
| Standard: | Aluminum | 1381.0 | 1275.3 |
| THPAn: | Aluminum | 1497.3 | 1331.0 |
| THPAc: | Aluminum | 1452.0 | |
| MA: | Aluminum | 1466.0 | 1327.0 |

While TABLE III presents the average tensile strength at which particular cured resins bonded to specified substrates failed, the table does not reveal the nature of the failure which occurred with respect to the various cured resin and substrate combinations.

The failure of the cured resin bonded to a respective substrate can be adhesive failure in which the bond between the cured resin and the substrate fails, or it can be cohesive failure in which the bond between portions of the cured resin fails while the bond between the cured resin and substrate does not fail, or it can be a combination of adhesive failure and cohesive failure as well.

With reference to the hot dipped galvanized lap shear panel tests, the failure of the standard resin fillers, both unreinforced and reinforced, was a combination of adhesive and cohesive failure, while the failure of the fillers modified in accordance with the instant invention, both unreinforced and reinforced, was cohesive failure unaccompanied by any adhesive failure. As to the steel lap shear panel tests, all samples, both those of cured standard resins of unreinforced and reinforced character, as well as the modified resins embodying this invention, resulted in cohesive failure only. The cohesive failure was not accompanied by any adhesive failure at all. The aluminum lap shear panel tests, like the steel lap shear panel tests, resulted in all samples having cohesive failure without adhesive failure. Additional similar lap shear tests using modified resins as described above and copper, brass, tin and stainless steel substrates, data as to which is not included in TABLE III, also resulted in cohesive failure unaccompanied by any adhesive failure.

While the invention has been described in detail and with reference to specific embodiments thereof, it will in part be obvious and in part be apparent to one having ordinary skill in the art that various changes and modifications can be made therein without departing from the spirit and scope of the invention.

Having described our invention, what we claim as new and desire to secure by letters patent is:

1. A composition consisting essentially of in combination an unsaturated polyester resin which comprises (1) a condensation polymer which is the reaction product of: (a) dicarboxylic acid, at least a portion of which contains ethylenic unsaturation, with (b) dihydric alcohol; and (2) an alpha-beta ethylenically unsaturated monomer, a determined amount of at least $C_8$ dicarboxylic functional unsaturated anhydride or acid additive selected from the group consisting of tetrahydrophthalic anhydride, tetrahydrophthalic acid, methylhexahydrophthalic anhydride, methylhexahydrophthalic acid, methyltetrahydrophthalic anhydride and methyltetrahydrophthalic acid incorporated in said resin and a resin curing agent, said composition having enhanced adhesion to substrates.

2. A composition according to claim 1 wherein said determined amount of at least $C_8$ dicarboxylic functional unsaturated anhydride or acid comprises about 1 to about 5 percent based upon total resin weight.

3. A process of producing modified polyester resins for polyester resin systems having improved adhesion to a wide range of substrates when cured which comprises incorporation of a determined amount of at least $C_8$ dicarboxylic functional unsaturated anhydride or acid additive selected from the group consisting of tetrahydrophthalic anhydride, tetrahydrophthalic acid, methylhexahydrophthalic anhydride, methylhexahydrophthalic acid, methyltetrahydrophthalic anhydride and methyltetrahydrophthalic acid, in an unsaturated polyester resin which comprises (1) a condensation polymer which is the reaction product of: (a) dicarboxylic acid, at least a portion of which contains ethylenic unsaturation, with (b) dihydric alcohol; and (2) an alpha-beta-ethylenically unsaturated monomer and addition of a resin curing agent so as to produce a composition consisting essentially of said unsaturated polyester resin, said at least $C_8$ dicarboxylic functional unsaturated anhydride or acid and said resin curing agent.

4. A process according to claim 3 wherein said determined amount of at least $C_8$ dicarboxylic functional unsaturated anhydride or acid comprises about 1 to about 5 percent based upon total resin weight.

5. A method of adhering polyester resin systems to a range of substrates such as hot-dipped galvanized steel, stainless steel, copper, bronze, tin, aluminum, solder, brass and glass comprising; incorporating at least a determined amount of $C_8$ dicarboxylic functional unsaturated anhydride or acid additive selected from the group consisting of tetrahydrophthalic anhydride, tetrahydrophthalic acid, methylhexahydrophthalic anhydride, methylhexahydrophthalic acid, methyltetrahydrophthalic anhydride and methyltetrahydrophthalic acid, and a resin curing agent in an unsaturated polyester resin which comprises (1) a condensation polymer which is the reaction product of: (a) dicarboxylic acid, at least a portion of which contains ethylenic unsaturation, with (b) dihydric alcohol; and (2) an alpha-beta ethylenically unsaturated monomer to form a polyester resin system, consisting essentially of said unsaturated polyester resin, said at least $C_8$ decarboxylic functional unsaturated anhydride or acid and said resin curing agent, applying said polyester resin system to a substrate, and curing said unsaturated polyester resin with said resin curing agent.

6. A method according to claim 5 wherein said determined amount of at least $C_8$ dicarboxylic functional unsaturated anhydride or acid comprises about 1 to about 5 percent based upon total resin weight.

* * * * *